United States Patent
Yu et al.

(10) Patent No.: US 10,228,835 B2
(45) Date of Patent: Mar. 12, 2019

(54) METHOD FOR DISPLAYING INFORMATION, AND TERMINAL EQUIPMENT

(71) Applicant: Beijing Kingsoft Internet Security Software Co., Ltd., Beijing (CN)

(72) Inventors: Ling Yu, Beijing (CN); Qingqing Yu, Beijing (CN); Ruimin Huang, Beijing (CN); Bo Chen, Beijing (CN); Wen-Chen Feng, Beijing (CN); Hujia Duman, Beijing (CN); Ni Gan, Beijing (CN); Xinwei Wu, Beijing (CN); Jiabo Zhou, Beijing (CN); Xiaoming Sun, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/418,086

(22) Filed: Jan. 27, 2017

(65) Prior Publication Data
US 2018/0181288 A1    Jun. 28, 2018

Related U.S. Application Data

(63) Continuation of application No. PCT/CN2016/111826, filed on Dec. 23, 2016.

(51) Int. Cl.
*G06F 3/0482* (2013.01)
*G06F 3/0484* (2013.01)
(Continued)

(52) U.S. Cl.
CPC .......... *G06F 3/04845* (2013.01); *G06F 9/451* (2018.02); *G09G 5/38* (2013.01); *G06F 2203/04803* (2013.01); *H04L 67/10* (2013.01)

(58) Field of Classification Search
None
See application file for complete search history.

(56) References Cited

U.S. PATENT DOCUMENTS 5,838,318 A * 11/1998 Porter ................... G06F 3/0481
715/790
6,111,573 A * 8/2000 McComb ............... G09G 5/363
345/661
(Continued)

FOREIGN PATENT DOCUMENTS

| CN | 103092985 | 5/2013 |
|---|---|---|
| CN | 105893827 | 8/2016 |
| CN | 106095252 | 11/2016 |

*Primary Examiner* — Yongjia Pan
(74) *Attorney, Agent, or Firm* — Norton Rose Fulbright US LLP

(57) ABSTRACT

The present application provides a method for displaying information, and a terminal equipment. The method for displaying information comprises: detecting whether a display screen of a terminal equipment switches from a screen-off state to a screen-on state when the display screen is in the screen-off state; displaying at least one information card on the display screen after it is detected that the display screen switches from the screen-off state to the screen-on state, wherein, the at least one information card includes information for informative purpose obtained from a network side, and the size of the at least one information card is smaller than that of the display screen. In the present solution, information for informative purpose is pushed to a user in the form of cards when a screen switches from a screen-off to a screen-on, such that the user can browse the information for informative purpose during the fragmented spare time when the screen switches between the screen-on and the screen-off, thereby improving the usage of fragmented spare time of users.

26 Claims, 9 Drawing Sheets

(51) Int. Cl.
*G06F 9/451* (2018.01)
*G09G 5/38* (2006.01)
*H04L 29/08* (2006.01)

(56) References Cited

U.S. PATENT DOCUMENTS

| | | | | |
|---|---|---|---|---|
| 6,504,530 B1* | 1/2003 | Wilson | G06F 3/0418 | 345/173 |
| 6,600,500 B1* | 7/2003 | Yamamoto | G06F 3/0481 | 715/779 |
| 6,825,860 B1* | 11/2004 | Hu | G06F 3/0481 | 345/660 |
| 7,437,578 B2* | 10/2008 | Menzl | G06F 1/3203 | 348/E5.127 |
| 7,577,449 B2* | 8/2009 | Simpson | H04W 52/0216 | 455/439 |
| 7,643,951 B2* | 1/2010 | Stewart | G06K 7/0008 | 702/63 |
| 7,657,281 B2* | 2/2010 | Eibye | H04M 1/72522 | 455/550.1 |
| 8,041,964 B2* | 10/2011 | Price | G06F 1/32 | 713/300 |
| 8,199,126 B1* | 6/2012 | Taubman | G06F 3/011 | 345/156 |
| 8,209,634 B2* | 6/2012 | Klassen | G06F 3/04817 | 715/859 |
| 8,423,995 B2* | 4/2013 | Hsieh | G06F 3/0483 | 709/203 |
| 8,458,619 B2* | 6/2013 | Hamzy | G06F 9/451 | 715/867 |
| 8,538,459 B2* | 9/2013 | Choi | H04M 1/72566 | 455/456.3 |
| 8,775,838 B2* | 7/2014 | Lee | G06F 1/32 | 713/320 |
| 8,830,270 B2* | 9/2014 | Zaman | G06F 3/04883 | 345/473 |
| 8,863,026 B2* | 10/2014 | Yamada | G06F 3/0481 | 715/794 |
| 9,110,671 B2* | 8/2015 | Eckert | G06F 1/324 | |
| 9,164,565 B2* | 10/2015 | Conrad | G06F 1/3203 | |
| 9,245,527 B2* | 1/2016 | Lindahl | G10L 15/32 | |
| 9,250,685 B2* | 2/2016 | O'Malley | G06F 1/3209 | |
| 9,612,713 B2* | 4/2017 | Kuscher | G06F 3/0486 | |
| 2003/0197739 A1* | 10/2003 | Bauer | G06F 3/0481 | 715/800 |
| 2006/0227153 A1* | 10/2006 | Anwar | G06T 3/0012 | 345/660 |
| 2007/0152976 A1* | 7/2007 | Townsend | G06F 3/0416 | 345/173 |
| 2007/0162850 A1* | 7/2007 | Adler | G06F 9/4443 | 715/700 |
| 2007/0298843 A1* | 12/2007 | Kwon | H04M 1/72572 | 455/566 |
| 2008/0220752 A1* | 9/2008 | Forstall | H04M 1/56 | 455/415 |
| 2009/0262078 A1* | 10/2009 | Pizzi | G06F 1/1626 | 345/169 |
| 2010/0042943 A1* | 2/2010 | Morris | G06F 3/0481 | 715/765 |
| 2010/0095240 A1* | 4/2010 | Shiplacoff | G06F 3/0483 | 715/784 |
| 2010/0146384 A1* | 6/2010 | Peev | H04M 1/673 | 715/255 |
| 2010/0159995 A1* | 6/2010 | Stallings | G06F 3/0488 | 455/566 |
| 2010/0248689 A1* | 9/2010 | Teng | H04M 1/67 | 455/411 |
| 2012/0071149 A1* | 3/2012 | Bandyopadhyay | G06F 1/1643 | 455/418 |
| 2012/0154303 A1* | 6/2012 | Lazaridis | G06F 1/3203 | 345/173 |
| 2012/0272230 A1* | 10/2012 | Lee | G06F 1/329 | 717/173 |
| 2012/0331548 A1* | 12/2012 | Tseng | G06F 21/31 | 726/19 |
| 2013/0057587 A1* | 3/2013 | Leonard | G06F 3/0488 | 345/660 |
| 2013/0063443 A1* | 3/2013 | Garside | G06T 15/005 | 345/473 |
| 2013/0067398 A1* | 3/2013 | Pittappilly | G06F 3/0482 | 715/800 |
| 2013/0100044 A1* | 4/2013 | Zhao | G06F 1/1694 | 345/173 |
| 2013/0162502 A1* | 6/2013 | Lee | G09G 5/003 | 345/1.2 |
| 2013/0205155 A1* | 8/2013 | Yang | G06F 1/3234 | 713/323 |
| 2013/0225238 A1* | 8/2013 | He | G06F 1/3234 | 455/558 |
| 2014/0040819 A1* | 2/2014 | Duffy | G06F 9/451 | 715/789 |
| 2014/0098032 A1* | 4/2014 | Ng | G06F 3/0418 | 345/173 |
| 2014/0136995 A1* | 5/2014 | Matas | G06F 3/0481 | 715/753 |
| 2014/0157026 A1* | 6/2014 | So | G06F 1/3206 | 713/323 |
| 2014/0282055 A1* | 9/2014 | Engel | G06F 3/0482 | 715/744 |
| 2014/0282084 A1* | 9/2014 | Murarka | H04L 51/32 | 715/752 |
| 2014/0289683 A1* | 9/2014 | Park | G06F 3/0488 | 715/863 |
| 2015/0092520 A1* | 4/2015 | Robison | G04G 21/02 | 368/9 |
| 2016/0018914 A1* | 1/2016 | Kuo | H04M 1/67 | 345/173 |
| 2016/0044091 A1* | 2/2016 | Doumet | H04L 67/10 | 715/745 |
| 2016/0132301 A1* | 5/2016 | Riscutia | G06F 3/0483 | 715/763 |
| 2017/0034331 A1* | 2/2017 | Hao | G06F 3/0488 | |
| 2017/0090683 A1* | 3/2017 | Liu | G06F 3/0481 | |
| 2017/0177292 A1* | 6/2017 | Agili | G06F 3/1462 | |

* cited by examiner

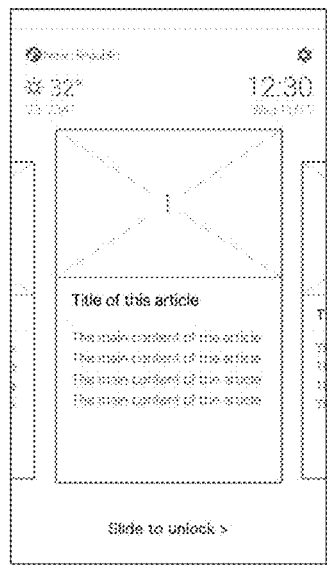
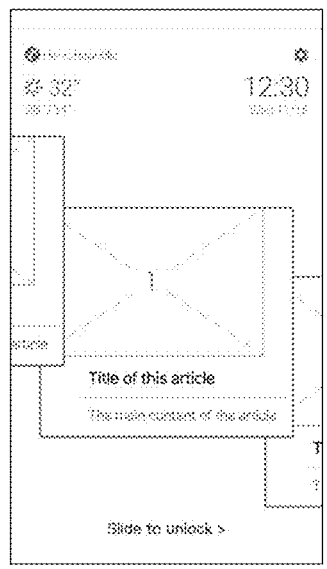
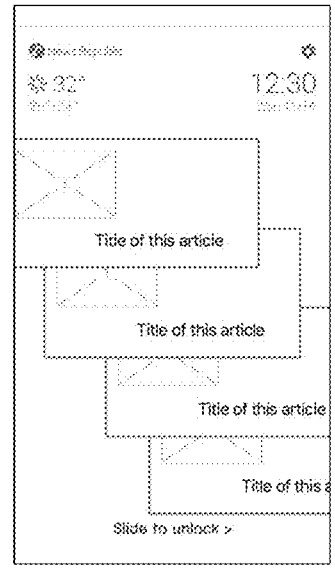
Fig. 9A　　　　　Fig. 9B　　　　　Fig. 9C
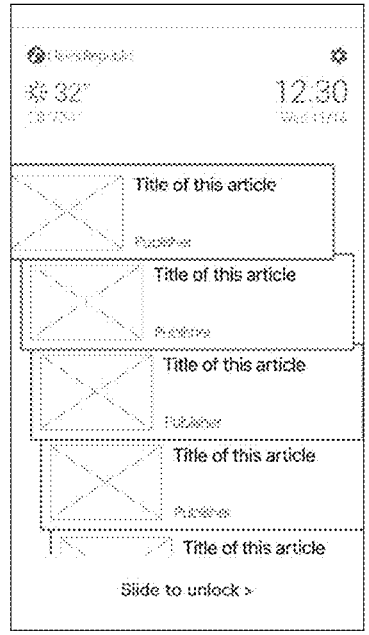
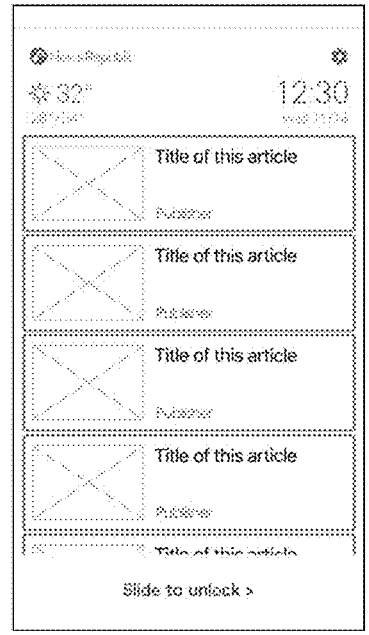
Fig. 9D　　　　　Fig. 9E

METHOD FOR DISPLAYING INFORMATION, AND TERMINAL EQUIPMENT

CROSS REFERENCE TO RELATED APPLICATION

The present application is a continuation of International Application No. PCT/CN2016/111826, filed Dec. 23, 2016. The entire contents of the above-referenced application are incorporated into the present application by reference.

TECHNICAL FIELD

The present application relates to the technical field of information processing, and particularly to a method for displaying information, and a terminal equipment.

BACKGROUND

At present, with more and more powerful functions of a terminal equipment, users can use the terminal equipment to perform a variety of operations, and meanwhile users rely more and more on the terminal equipment. For example, a user may light up the display screen of a terminal equipment display frequently without performing other operations subsequently.

In other words, users may have some fragmented spare time without any plans. In existing terminal applications, the fragmented spare time of users can not be utilized.

SUMMARY OF THE INVENTION

The objective of embodiments of the present application is to provide a method and device for displaying information as well as a terminal equipment, so as to improve the usage of fragmented spare time of users. The specific technical solutions are provided as follows.

In a first aspect, embodiments of the present application provide a method for displaying information, which comprises:

detecting whether a display screen of a terminal equipment switches from a screen-off state to a screen-on state when the display screen is in the screen-off state; and displaying at least one information card on the display screen after detecting that the display screen switches from the screen-off state to the screen-on state, wherein, the at least one information card includes information for informative purpose obtained from network side, and the size of the at least one information card is smaller than that of the display screen.

In a second aspect, embodiments of the present application further provide a device for displaying information, which comprises:

a state detecting module for detecting whether a display screen of a terminal equipment switches from a screen-off state to a screen-on state when the display screen is in the screen-off state; and an information card display module for displaying at least one information card on the display screen after detecting that the display screen switches from the screen-off state to the screen-on state, wherein, the at least one information card includes information for informative purpose obtained from network side, and the size of the at least one information card is smaller than that of the display screen.

In a third aspect, embodiments of the present application further provide a terminal equipment, which comprises: a processor, a memory, communication interfaces, input/output interfaces and a bus, wherein the processor, the memory, the communication interfaces and the input/output interfaces are connected to the bus respectively, the memory is used for storing executable program codes; the processor executes a program corresponding to the executable program codes by reading the executable program codes stored in the memory so as to perform the following steps:

detecting whether a display screen of a terminal equipment switches from a screen-off state to a screen-on state when the display screen is in the screen-off state; and displaying at least one information card on the display screen after detecting that the display screen switches from the screen-off state to the screen-on state, wherein, the at least one information card includes information for informative purpose obtained from network side, and the size of the at least one information card is smaller than that of the display screen.

In a fourth aspect, embodiments of the present application further provide an application program, which is used for performing the method for displaying information provided by the present application when in operation.

In fifth aspect, the embodiments of the present application further provide a storage medium, which is configured to store the executable program codes that are operated to perform the method for displaying information provided by the present application.

The solution provided by the embodiments of the present application comprises: detecting whether a display screen of a terminal equipment switches from a screen-off state to a screen-on state when the display screen is in the screen-off state; and displaying at least one information card on the display screen after detecting that the display screen switches from the screen-off state to the screen-on state, wherein, the at least one information card includes information for informative purpose obtained from network side, and the size of the at least one information card is smaller than that of the display screen. In the present solution, information for informative purpose is pushed to a user in the form of information cards when a display screen of a terminal device switches from a screen-off to a screen-on, such that the user can browse the information for informative purpose during the fragmented spare time when the screen switches between the screen-on and the screen-off, thereby improving the usage of fragmented spare time of users.

BRIEF DESCRIPTION OF DRAWINGS

In order to describe the embodiments of the present application and the technical solutions in the prior art more clearly, drawings for the embodiments of the present application and the prior art will be described briefly below. It is obvious that the drawings below are for only some embodiments of the present application, and those skilled in the art can also obtain further drawings based on these drawings without any creative efforts.

FIGS. 9A-9E are line drawings of interfaces for displaying information provided by embodiments of the present application;

DETAILED DESCRIPTION OF THE INVENTION

In order to make the objections, technical solutions as well as advantages of the present application more apparent and understandable, the present application will be described in more detail below with reference to the appended drawings and embodiments. Obviously, the described embodiments are only some of the embodiments of the present application, rather than all of the embodiments. All other embodiments obtained based on the embodiments of the present application by those skilled in the art without doing creative works fall into the protection scope defined by the present application.

In order to resolve the existing technical problems, embodiments of the present application provide a method and device for displaying information as well as a terminal equipment, so as to improve the usage of fragmented spare time of users.

Firstly, a method for displaying information provided by the embodiments of the present application will be described below.

It should be noted that, the method for displaying information provided by the embodiments of the present application can be applied to a terminal equipment. In specific applications, the terminal equipment may be a smart phone, a tablet, a notebook computer and a desktop computer and the like, and the display screen of the terminal equipment may be a touch screen or a non-touch screen, wherein, the touch screen may be a vector pressure sensor touch screen, a resistive touch screen, a capacitive touch screen, an infrared touch screen or a surface acoustic wave touch screen and the like, which is not limited in the embodiments of the present application. Moreover, the method for displaying information provided by the embodiments of the present application can be performed by a device for displaying information, which may be a specialized client software, and also may be a functional plug-in in an existing client software. For example: the existing client software may be a browser client, a client for management, for assistant or for other tools, and the like, which are all reasonable.

Figure 1:
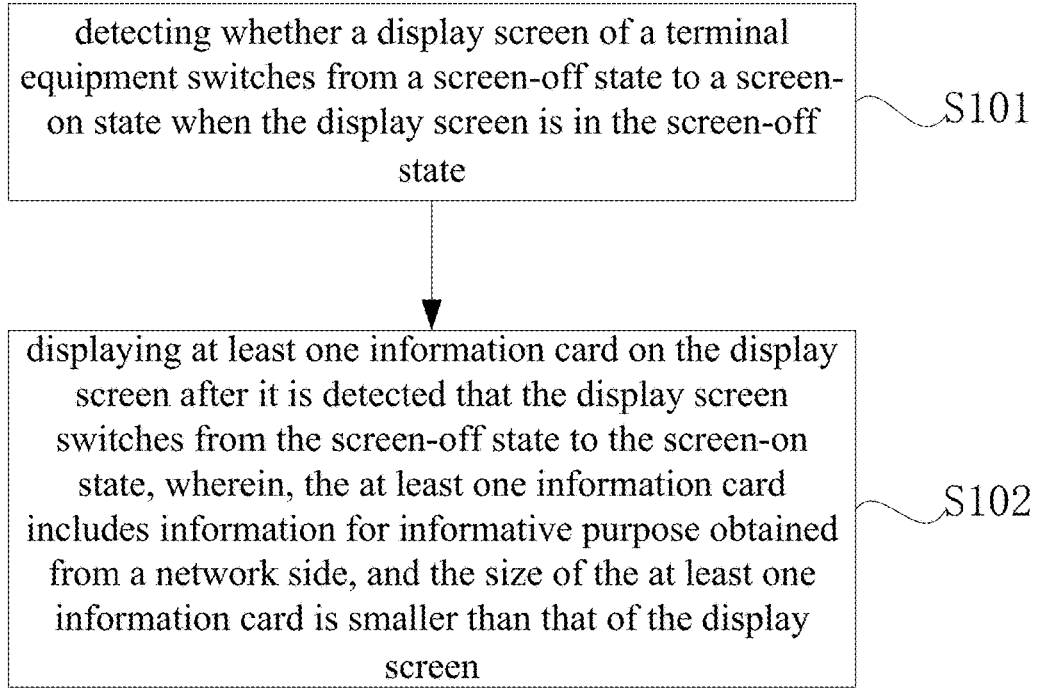
FIG. 1 is a flowchart of a method for displaying information provided by embodiments of the present application.

As shown in FIG. 1, the method for displaying information provided by the embodiments of the present application can comprise the following steps:

S101, detecting whether a display screen of a terminal equipment switches from a screen-off state to a screen-on state when the display screen is in the screen-off state;

wherein, the screen-off state is a state in which a display screen powers down, the screen-on state is a state in which a display screen powers up. The switching of a display screen from a screen-off state to a screen-on state normally indicates that a user has performed some operations on the terminal equipment, i.e., a user is performing operations on the terminal equipment at this moment. It can be understood that, the screen-off state is a state that a display screen is to experience before the screen is locked, but when the display screen is in the screen-off state, the terminal equipment may be in a lock-screen state or non-lock-screen state, which specifically depends on users or system settings.

It should be emphasized that, the time period during which a user operates a terminal equipment is usually relatively fixed, i.e., a user often operates a terminal equipment only during a certain fixed time period, and rarely operates or does not operate the terminal equipment at all during the time period other than the fixed time period. Thus, when a display screen is in the screen-off state during the time period other than the fixed time period, the detection of the display screen will be meaningless. Thus, optionally, in a specific implementation, in order to save power, it is possible to set a certain detection time period according to the usage of a terminal equipment by a user, i.e., during this time period of detection, if the display screen of a terminal equipment is in the screen-off state, detect whether this display screen of the terminal device switches from the screen-off state to the screen-on state. It can be understood that, this time period of detection can be set by a device for displaying information according to the usage of a terminal equipment by a user, and can also be set by the user manually, both of which are both reasonable. For example, a user usually operates a terminal equipment from 6:00 AM to 12:00 PM, then, the device for displaying information can set the time period of detection as from 6:00 AM to 12:00 PM, and no detection will be carried out during other time period, thereby saving power. For another example, a user can get access to a setup interface provided by the device for displaying information and voluntarily set the time period of detection according to their own habits, so as to save power.

Moreover, during the usage of a terminal equipment, when some applications are being used by a user, the screen will automatically power down so as to save power and automatically power up when a certain trigger point is achieved, but the user does not want the display of other additional information at that time. For example, normally, the screen will automatically power down during a telephone communication, and upon the completion of the communication, it will automatically power up. Although the display screen switches from a screen-off state to a screen-on state, the user may not want the display of additional information at that time. Therefore, in order to make more rational use of fragmented spare time of users, optionally, in a specific implementation, detecting whether a display screen of a terminal equipment switches from a screen-off state to a screen-on state, when the display screen is in the screen-off state and in a lock-screen state.

Of course, since a display screen is in a screen-off state both when the display screen is in the lock-screen state and when the display is in the non-lock-screen state, and in both state the display screen will switch from the screen-off state to the screen-on state, when the display screen of a terminal device is in the screen-off state, no matter whether the display screen is in the lock-screen state or the non-lock-screen state, it is possible to detect whether the display screen switches from the screen-off state to the screen-on state theoretically, and specifically the detection to be carried out only in the lock-screen state, or only in the non-lock-screen state, or both in the lock-screen state and in the non-lock-screen state can be set according to the actual situation.

S102, displaying at least one information card on the display screen after it is detected that the display screen switches from the screen-off state to the screen-on state, wherein, the at least one information card includes information for informative purpose obtained from a network side, and the size of the at least one information card is smaller than that of the display screen.

The switching of a display screen from the screen-off state to the screen-on state normally indicates that a user is operating the terminal equipment. Thus, in order to make effective use of the fragmented spare time of the user, the device for displaying information can display at least one information card on the display screen after it is detected that the display screen switches from the screen-on state to the screen-off state. It should be noted that, the information card currently being displayed on the display screen can be understood as a combined carrier for controlling and displaying information and to provide an interface for controlling and displaying information. In particular, the above information card can be used only for information display, and can also be used for both information display and information input, which is not limited in the embodiments of the present application.

Optionally, in order to avoid that the switching of a display screen from the screen-on state to the screen-off state is triggered by a false touch operation, and to thereby push information for informative purpose to users more reasonably, after it is detected that the display screen switches from the screen-off state to the screen-on, it is possible not to immediately display at least an information card on the display screen, but to add a step for determining the period of the screen-on. And the step of displaying at least one information card on the display screen is performed only when the period during which the screen maintains bright exceeds a certain preset value. Based on this processing idea, in the method for displaying information provided by the embodiments of the present application, after it is detected that a display screen switches from the screen-off state to the screen-on state, it is possible to determine whether the display screen is maintained in the screen-on state for a preset screen-on period, and if so, performing the step of displaying at least one information card on the display screen. Wherein, the specific time length value of the preset screen-on period can be set according to the actual situations, which is not limited in the embodiments of the present application. For example, the preset screen-on period can be 0.5 s, 1 s, 1.5 s, 2 s, 2.5 s, 3 s and the like.

Figure 4:
FIG. 4 is a schematic view of an interface for displaying information provided by embodiments of the present application.

It should be emphasized that, in order to reflect the different visual effects of an information card and a page, the size of at least one information card displayed on the display screen is smaller than that of the display screen, i.e., the information card currently being displayed on the display screen may not fill up the entire display screen. Specifically, when the at least one information card is one information card, the size of this information card is smaller than that of the display screen; and when the at least one information cards are two or more information cards, the overall size of these information cards is smaller than that of the display screen. In addition, the specific aspect ratio, card style and the specific location of an information card on a display screen can be varied. Specifically, as to the specific location, at least one information card may be located in the center area of the display screen, i.e., the center point of the information card coincides with that of the display screen, and may also not be located in the center area, for example, on the right side, left side, right upper side or left upper side of the display screen; as to the aspect ratio, under the guarantee that the size of the at least one information card is smaller than that of the display screen, the aspect ratio of the at least one information card can be identical or different with that of the display screen. It should be emphasized that, when the at least one information cards are two or more information cards, the overall aspect ratio of these information cards can be identical or different with that of the display screen; as to the card style, the information card can be a quadrilateral whose four corners can be rounded or right-angled, and the radius of the rounded corners can be varied. Of course, the information card may also not be a quadrilateral, which is also reasonable. For example, as shown in FIG. 4, a schematic view illustrating the display of an information card on a display screen is given.

The information card can include a multimedia resource display area and/or a text area, wherein the multimedia resource display area is used for displaying multimedia resource information, and the text area is used for displaying text information, and wherein, the multimedia resource information can include pictures, videos and the like, and be related or not related with the information for informative purpose. Wherein, the layout of the multimedia resource display area and the text area can be varied, which is not limited in the embodiments of the present application. For example, the multimedia resource display area and the text area can be vertically arranged, wherein, the multimedia resource display area can be located above or below the text area. For example, as shown in FIG. 4, the multimedia resource display area is located above the text area; the multimedia resource display area and the text area can be horizontally arranged, wherein, the multimedia resource display area can be located on the left or right side of the text area, and the like. It can be understood that, information for informative purpose in each information card can be a piece of complete information for informative purpose, and can also be a part of a piece of information for informative purpose, which are both reasonable. And the information for informative purpose included in various information cards is different. It should be emphasized that, it is possible to obtain plural pieces of information for informative purpose from the network side, and the at least one information card can display some of the plurality of pieces of information for informative purpose, the selection of some pieces of information for informative purpose from plural pieces of information for informative purpose can be carried out according to preset screening rules, which can be determined according to how much a user is interested in various obtained information resources from previous statistical work, or based on the time of the information for informative purpose.

Specifically, the step of displaying at least one information card on the display screen can comprise: displaying the at least one information card on the display screen horizontally. Moreover, it can be understood that, the specific number of at least one information card can be set by users, and can also be determined by a device for displaying information according to the size of the display screen. For example, when a terminal equipment is a smart phone, one information card may be displayed due to the limited size of the display screen, so as to push clearer content to users; when a terminal equipment is a tablet computer, at least two information cards may be displayed since the display screen is larger compared to a smart phone, so as to push more content to users. Of course, the number of the information cards displayed on the display screen of a smart phone is not limited to one, and can also be at least two; while the number of the information cards displayed on a display screen of a tablet computer is not limited to at least two, and can also be one. And, when at least two cards are displayed on a display screen, the size of the at least two information cards can be exactly identical, and can also be not exactly identical. When the size of the at least two information cards is exactly identical, these cards can be uniformly arranged, and can also be non-uniformly arranged, i.e., in a staggered manner. Of course, the specific horizontal arrangement can be set according to the actual situation, which is not limited in the present application. It should be emphasized that, the display screen of a terminal device can rotate, i.e., from a portrait mode to a landscape mode or from a landscape mode to a portrait mode. Thus, in order to adapt to the display screen well, when the rotation of the display screen is detected, it is possible to adaptively adjust the number, the size and location of the displayed information card according to the aspect ratio of the current display screen, so as to comply with the habit of users.

It can be understood that, the type of information for informative purpose obtained from network side can comprise: news, practical type, advertisement and the like. Wherein, the information for informative purpose of the news includes, but is not limited to, sports, entertainment, military information and the like, information for informative purpose of practical type includes, but is not limited to, weather, stock, housing prices information and the like, and the advertisement type of information for informative purpose includes, but is not limited to, physical product advertisement, commercial service advertisement and the like. Moreover, it is possible to obtain plural pieces of information for informative purpose from the network side, and at least one of the plural pieces of information for informative purpose are displayed on a display screen through at least one information card, and the at least one piece of information for informative purpose displayed can be obtained by preset screening rules.

Optionally, in a specific implementation, the information for informative purpose obtained from network side can comprise: received information for informative purpose sent by a network-side server. In this implementation, the information for informative purpose can be voluntarily pushed by the network-side server, and can also be obtained by voluntarily requesting the network-side server, which are both reasonable.

In addition, optionally, in another specific implementation, the information for informative purpose obtained from the network side can comprise: information for informative purpose obtained from the network-side server according to user instruction. In this implementation, a user can preset the type of the information for informative purpose needed, i.e., send a specific user instruction to a device for displaying information and thereby the device for displaying information can obtain related information by web crawler crawling, and can also obtain the related information by requesting a specific server at the network side.

It should be emphasized that, in the case that the information for informative purpose is obtained from a network-side server according to a user instruction and the information for informative purpose is obtained by a device for displaying information through voluntarily requesting a network-side server, then optionally, in a specific implementation, in order to obtain real-time information for informative purpose, the information for informative purpose included in at least one information card can be obtained from the network side after it is detected that the display screen switches from the screen-off state to the screen-on state. Of course, optionally, in another specific implementation, in order to achieve an improved display efficiency, especially when the network condition is not good, information for informative purpose included in at least one information card can be prepared in advance. In this way, when it is detected that a display screen switches from a screen-off to a screen-on, it is possible to directly display at least one information card including the information for informative purpose prepared in advance.

At the same time, in order to improve the sensory effect and facilitate users to get to know the source of information, the background content of an information card can correspond to the source of information for informative purpose, or the title of an information card can correspond to the source of information for informative purpose, such that users can clearly know the source of information for informative purpose in the information card currently being displayed. For example: when the information for informative purpose is obtained by web crawler crawling and the device for displaying information is a special client software, the background content and/or the title of an information card can be related with the device for displaying information, such that users can clearly know that the information for informative purpose within the information card is provided by this device for displaying information; when the information for informative purpose is provided by a stock server belonging to a third party and the device for displaying information is a special client software, the background content and/or the title of an information card can be related with the stock server and the device for displaying information, such that users can clearly know that the information for informative purpose within the information card is obtained from this stock server by this device for displaying information.

The method for displaying information provided by the embodiments of the present application comprises: detecting whether a display screen of a terminal equipment switches from a screen-off state to a screen-on state when the display screen is in the screen-off state; displaying at least one information card on the display screen after it is detected that the display screen switches from the screen-off state to the screen-on state, wherein, the information card includes information for informative purpose obtained from a network side, and the size of the information card is smaller than that of the display screen. In the present solution, information for informative purpose is pushed to a user in the form of information cards when a display screen of a terminal device switches from a screen-off to a screen-on, such that the user can browse the information for informative purpose during fragmented spare time when the screen switches between the screen-on and the screen-off, thereby improving the usage of fragmented spare time of users.

Optionally, when plural pieces of information for informative purpose are obtained, there can be a plurality of information cards, and these information cards can be displayed on a display screen at different time; and in order to remind users that there are other information cards that can be browsed, in the method for displaying information provided by the embodiments of the present application, when at least one information card is displayed on a display screen, it is possible to display prompt message in a preset position of the display screen, the prompt message being used for prompting the presence of other information cards. It can be understood that, in one implementation, it is possible to display prompt symbols of an arrow type at the edge location (such as an inner edge or an outer edge) of the information card currently being displayed, and the edge location can be located in at least one of the upper, lower, left and right edges. Wherein, the arrow can be displayed in a highlighted or blurred manner, which are both reasonable. Wherein, there can be a variety of highlighting methods, for example, highlighting by rendering lines bold or by adding colors for lines.

Wherein, in a specific implementation, the step of displaying prompt message on a preset position of the display screen can comprise: displaying a prompt card on the preset position of the display screen. Wherein, the number of the prompt cards can be one or more, the relationship between the size of the prompt card and that of the information card currently being displayed can be set according to the actual situation, which is not limited by the embodiments of the present application. And, the prompt card can belong to the thumbnails of other information cards prompted, and can also be a part of other information cards prompted, and can also be other information card of a smaller version, i.e., the information card of a smaller size, which are all reasonable. Wherein, the preset location can be a screen edge, wherein, the screen edge can be at least one of the upper, lower, left and right screen edges. Of course, the preset location can also be a card edge, wherein, the card edge can be at least one of the upper, lower, left and right edges of an information card. In addition, the prompt card can be blurred or not blurred. In former case, the prompt card can be highlighted or not highlighted, there are a variety of highlighting methods, for which the present application is not limited.

Further, in order to comply with the using and watching habits of users, the step of displaying a prompt card on a preset position of the display screen can comprise:

displaying the prompt card on the left boundary and/or the right boundary of the display screen, wherein, the size of the prompt card is set according to the remaining size of the display screen which is the size obtained by subtracting, from the size of the display screen, the size of the information card currently being displayed.

It can be understood that, the content of the information card in the left edge can be information located before the information for informative purpose in the information card currently being displayed in a preset information arrangement sequence, which sequence is the sequence generated by sorting plural pieces of information for informative purpose obtained from the network side; the content of the information card in the right edge can be information located after the information for informative purpose in the card currently being displayed in a preset information arrangement sequence, to which the present application of course is not limited.

Figure 5:
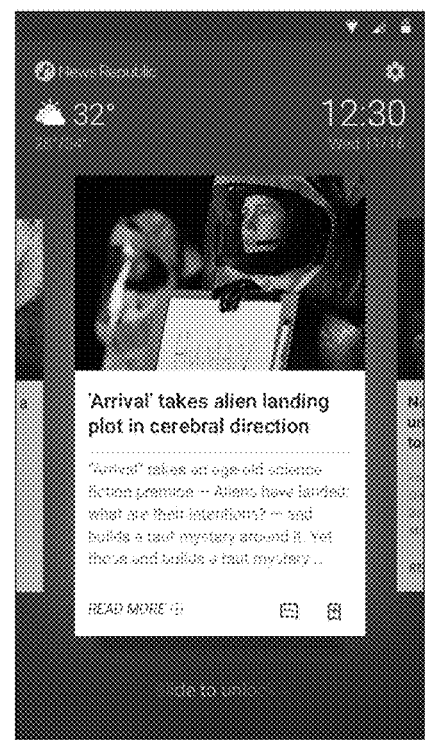
FIG. 5 is a schematic view of an interface for displaying information provided by embodiments of the present application.

For example, FIG. 5 provides a schematic view of an interface of a display screen, which is specifically to display one information card on the display screen and meanwhile display a prompt card on the right and left edges of the display screen.

Figure 2:
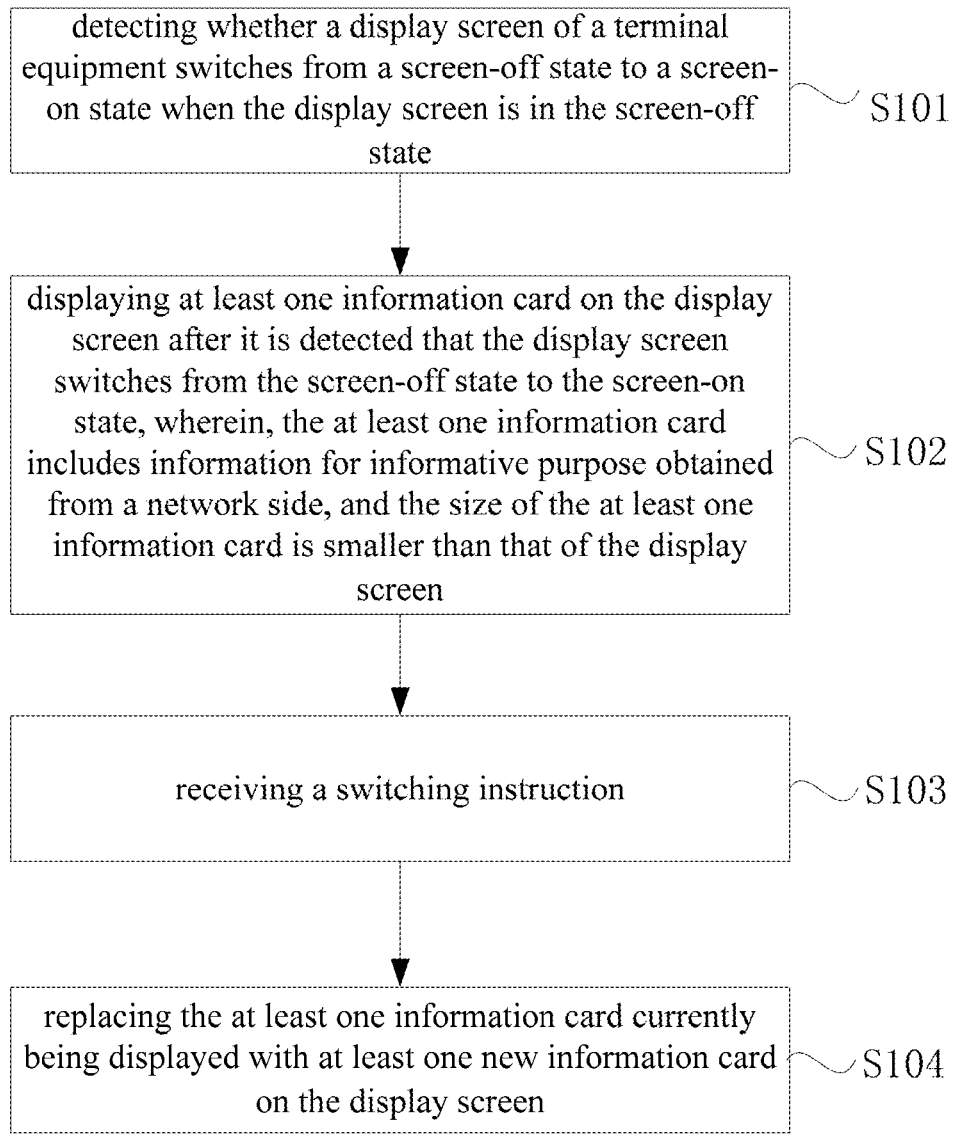
FIG. 2 is a flowchart of another method for displaying information provided by embodiments of the present application.

Optionally, in order to improve the interaction between users and terminals, as shown in FIG. 2, based on the embodiment of the above S101-S102, the method for displaying information provided by the embodiments of the present application can also comprise the following steps:

S103, receiving a switching instruction;

S104, replacing the at least one information card currently being displayed with at least one new information card on the display screen.

Wherein, the at least one new information card includes information for informative purpose obtained from the network side.

It can be understood that, the step of receiving a switching instruction can comprise: receiving a switching instruction input by a user; or receiving a switching instruction generated according to a preset rule.

Specifically, when the switching instruction is issued by a user and the display screen is a touch screen, the user can issue the switching instruction by clicking on a button. For example, a button that is shown on a card and is provided with prompt characters or other prompt symbols such as "the previous one" or "the following one". Of course, the user can issue a switching instruction by a preset gesture operation, wherein, the type of the gesture operation can include, but is not limited to, a terminal shaking operation and a sliding operation on the screen, and different directions of gesture operations of the same type may indicate different switching mode, such as forward switching or backward switching. Of course, when the display screen is a non-touch screen, a user can issue a switching instruction by a keyboard or mouse of the terminal equipment.

Specifically, when the switching instruction is generated by preset rules, the preset rules can be periodically updated, or updated when trigger conditions are met, for example, the trigger conditions can be that no operations for an information card are detected for a preset period and the like.

Moreover, during the replacement of a card, it can be replaced in situ, i.e., there is no card switching effect. Of course, in order to improve the interest, switching effect can be slowly entering, generating by explosion, and shuttering and the like, the specific replacement effects are not limited in the embodiments of the present application.

In one implementation, the step of receiving a switching instruction comprises: receiving a rightward switching instruction or a leftward switching instruction; correspondingly, the step of replacing the at least one information card currently being displayed with at least one new information card on the display screen comprises:

when receiving the rightward switching instruction, moving the at least one information card currently being displayed rightward out of the display screen while moving the at least one new information card into the display screen from left to right; and when receiving the leftward switching instruction, moving the at least one information card currently being displayed leftward out of the display screen while moving at least one new information card into the display screen from right to left.

Specifically, the rightward switching instruction is issued by a rightward sliding gesture, the leftward switching instruction is issued by a leftward sliding gesture, to which the present application is of course not limited.

Figure 6A:
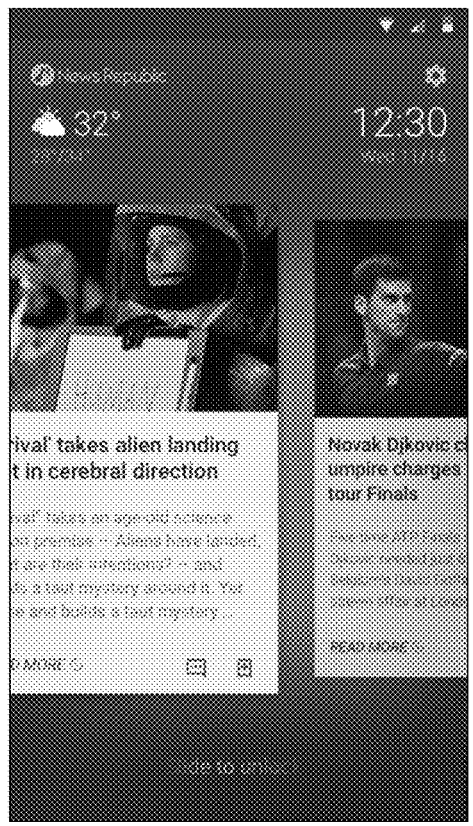
FIG. 6A and FIG. 6B are schematic view of interfaces for displaying information provided by embodiments of the present application.
Figure 6B:
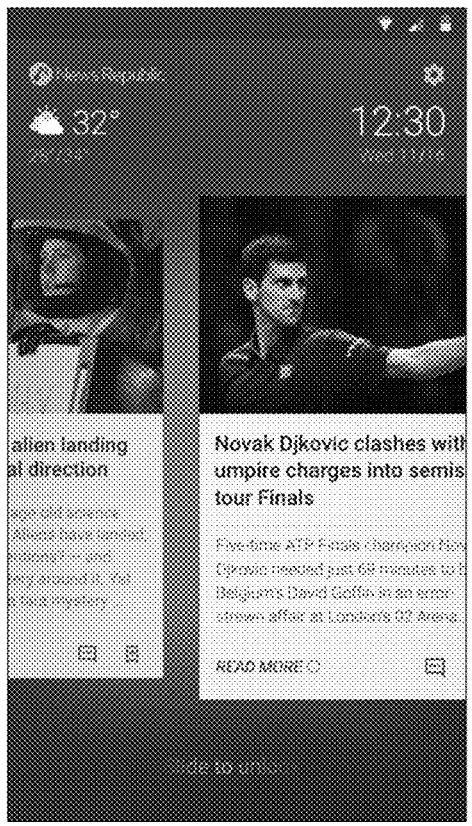
Figure 7:
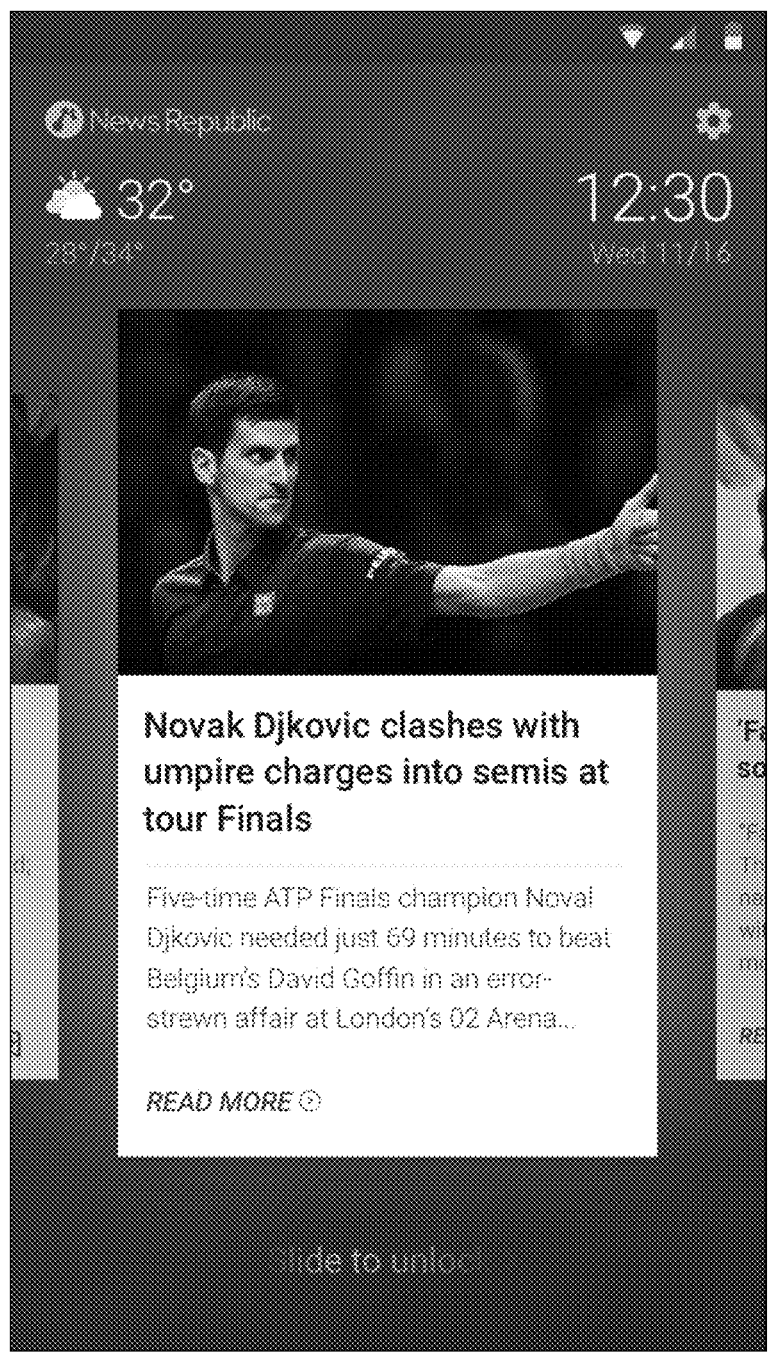
FIG. 7 is a schematic view of an interface for displaying information provided by embodiments of the present application.
Figure 8A:
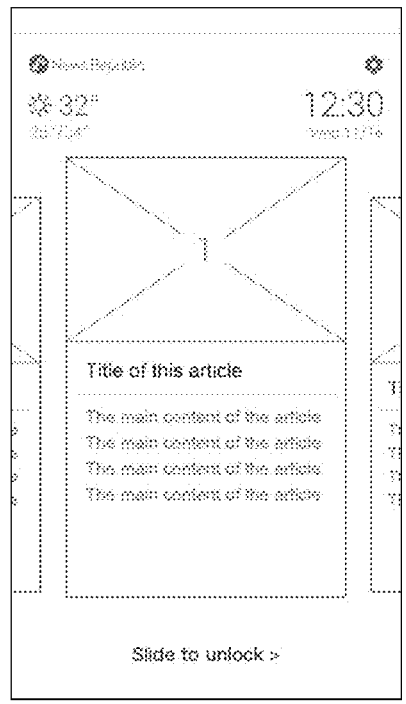
FIGS. 8A-8D are line drawings of interfaces for displaying information provided by embodiments of the present application.
Figure 8B:
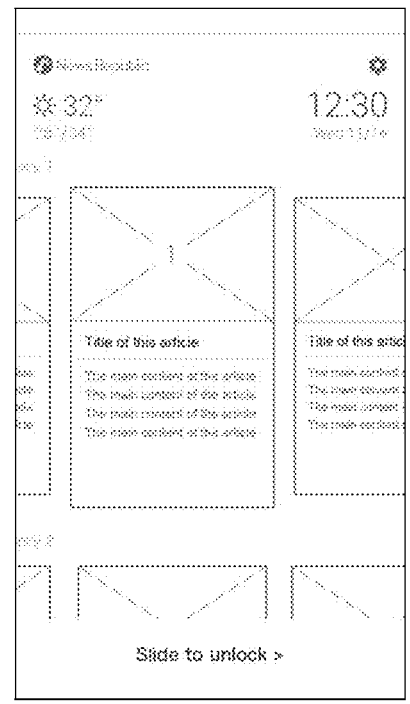
Figure 8C:
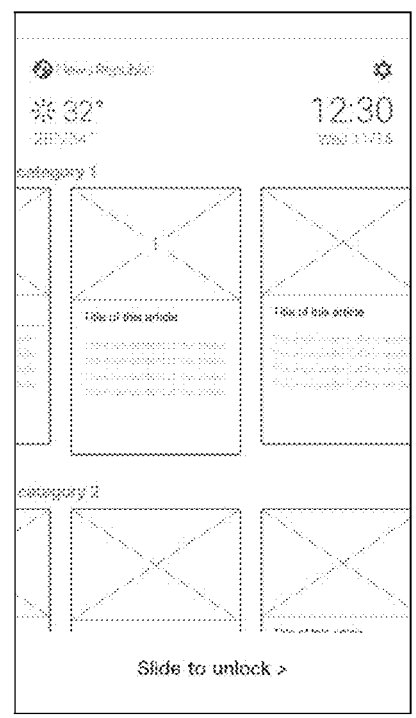
Figure 8D:
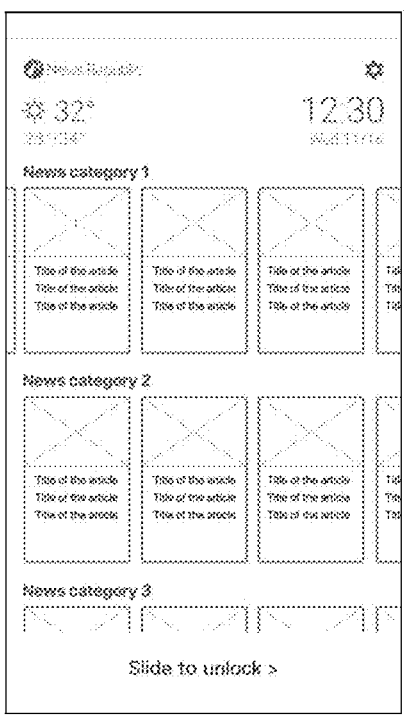

For example: FIGS. 5 to 7 show the switching effect corresponding to a leftward switching instruction. FIG. 5 is a schematic view of an interface of a display screen before switch, FIG. 6A and FIG. 6B illustrate the process during which the information card currently being displayed is moved out from the left and a new information card is moved into the display screen from right to left, FIG. 7 is a schematic view of an interface of a display screen after switch.

It should be emphasized that, if one information card is displayed on a display screen, the information card currently being displayed is replaced with a new information card during switch, the information for informative purpose in the new information card being different from that in the information card currently being displayed. And if two or more information cards are displayed on a display screen, the information cards currently being displayed are replaced with the same number of new information cards during switch, wherein, the same number of new information cards can only include information cards except the information cards currently being displayed, and can also include not only information cards except the information cards currently being displayed but also the information cards currently being displayed, which is specifically determined by the switching number corresponding to the preset switching instruction. It can be understood that, when switch occurs, each piece of information card currently being displayed will be replaced by another information card, which is new with respect to the information card currently being displayed. One example: when three information cards 10, 11 and 12 are displayed on a display screen, assuming that there is a switching instruction for switching one information card, when a rightward switching instruction is received, it is determined that the new information card corresponding to the information card 10 is the information card 09, the new information card corresponding to the information card 11 is the information card 10, and the new information card corresponding to the information card 12 is the information card 11, and the information for informative purpose included in the information card 09 is different from that in the information cards 10, 11 and 12. Another example: when three information cards 10, 11 and 12 are displayed on a display screen, assuming that there is an information switching instruction for switching three information cards, when a rightward switching instruction is received, it is determined that the new information card corresponding to the information card 10 is the information card 07, the new information card corresponding to the information card 11 is the information card 08, and the new information card corresponding to the information card 12 is the information card 09, and the information for informative purpose included in the information card 07, 08 and 09 is different from that in the information cards 10, 11 and 12.

In the embodiments of the present application, the usage of fragmented spare time of users is improved and meanwhile the interaction between users and terminals can be further enhanced.

Figure 3:
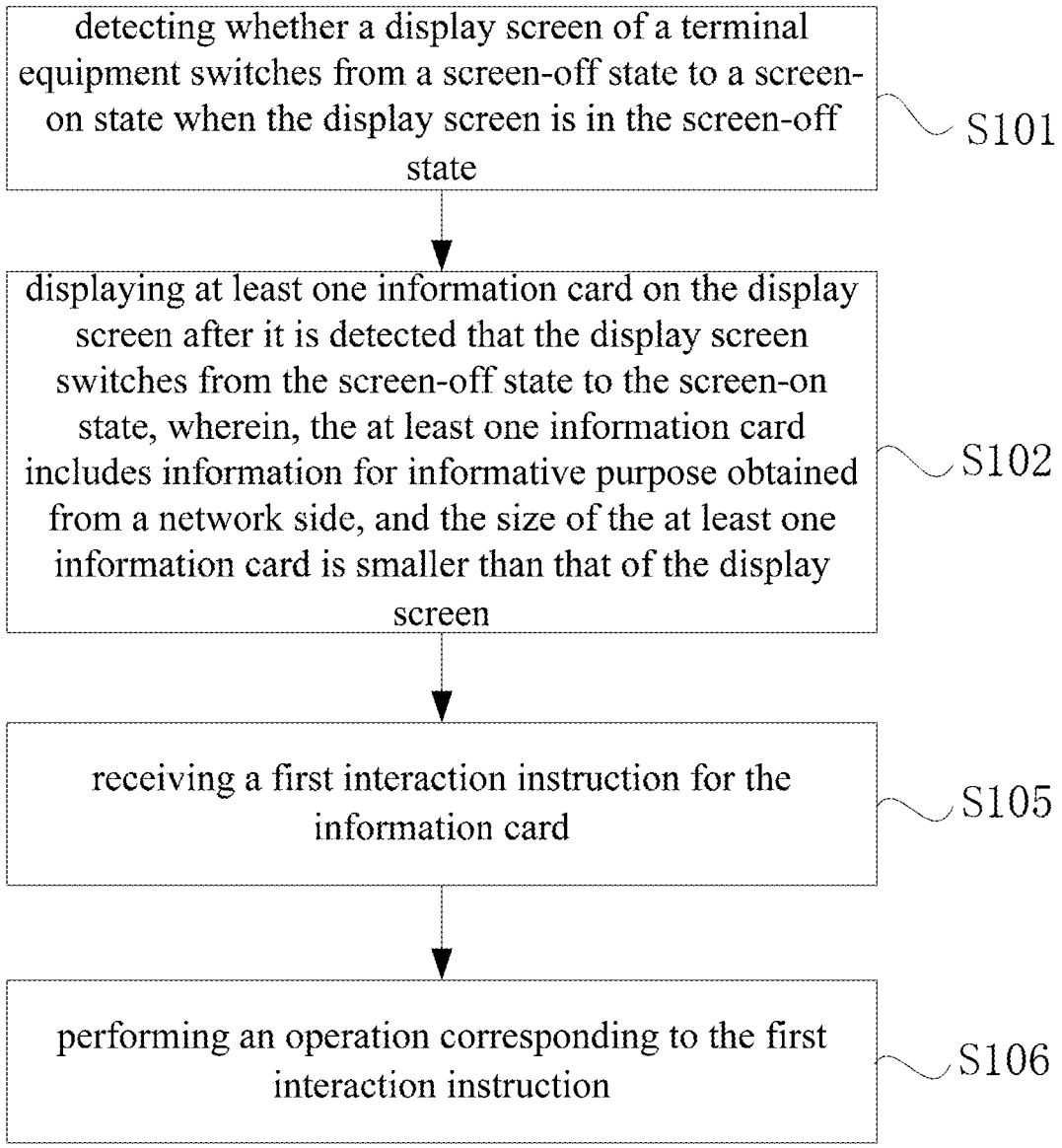
FIG. 3 is a flowchart of another method for displaying information provided by embodiments of the present application.

Optionally, in order to improve the interaction between a user and a terminal equipment, as shown in FIG. 3, based on the steps of S101-S102 included, the method for displaying information provided by the embodiments of the present application can also comprise:

S105, receiving a first interaction instruction for the information card;

S106, performing an operation corresponding to the first interaction instruction.

In a specific implementation, the first interaction instruction is an instruction of moving out a card, correspondingly, the step of performing an operation corresponding to the first interaction instruction comprises: moving the information card upward or downward out of the display screen. Wherein, the instruction of moving out a card can be issued by clicking on a button or by a gesture operation. And after an information card is moved out of a display screen, the information card can be collected and can also be destroyed, the specific processing mode can be set according to the actual situations. In practical applications, a user can perform an upward sliding operation on an information card in the display screen and issue an instruction of moving out a card, and then a device for displaying information moves the information card for which the instruction of moving out a card is issued upward out of the display screen after receiving the instruction of moving out a card. Similarly, a user can perform a downward sliding operation on an information card in the display screen and issue an instruction of moving out a card, and then a device for displaying information moves the information card for which the instruction of moving out a card is issued downward out of the display screen after receiving the instruction of moving out a card.

In a specific implementation, the first interaction instruction is an instruction of flipping over card. Correspondingly, the step of performing an operation corresponding to the first interaction instruction comprises: flipping over the information card. Wherein, the content of an information card displayed on a display screen after the card is flipped over is related with the information for informative purpose before the card is flipped over. Wherein, the content of an information card after flipped over which is related with the information for informative purpose before the card is flipped over can be embodied as: the content of an information card after flipped over is the detailed content of the information for informative purpose before the card is flipped over, or the content of an information card after flipped over is the extension content of the information for informative purpose before the card is flipped over, such as comments, similar content and the like. Furthermore, the instruction of flipping over card can be issued by clicking on a button or by a gesture operation, which is not limited in the embodiments of the present application.

In a specific implementation, the first interaction instruction is an instruction of adjusting card size. Correspondingly, the step of performing an operation corresponding to the first interaction instruction comprises: adjusting the size of the information card on the display screen. Wherein, the instruction of adjusting card size can be issued by clicking on a button or by a gesture operation, which is not limited in the embodiments of the present application. For example, a zooming-out/zooming-in gesture can be issued to an information card to achieve the purpose of scaling the information card, wherein the zooming-out/zooming-in gesture can be similar to a zooming-out/zooming-in gesture for pictures in the prior art.

In a specific implementation, the first interaction instruction is an instruction of adjusting the number of cards. Correspondingly, the step of performing an operation corresponding to the first interaction instruction comprises: adjusting the number of the information cards displayed on the display screen. Wherein, the instruction of adjusting the number of cards can be issued by clicking on a button or by a gesture operation, which is not limited in the embodiments of the present application. For example, the instruction of adjusting the number of cards is obtained when a rotation operation of a screen is detected.

In a specific implementation, the first interaction instruction is an information state adjusting instruction. Correspondingly, the step of performing an operation corresponding to the first interaction instruction comprises: adjusting the display state of information in the information card. Wherein, the information state adjusting instruction can be issued by clicking on a button or by a gesture operation, which is not limited in the embodiments of the present application. Moreover, the adjustment of the information display status includes, but is not limited to, enlarging or reducing the font of the text content, or expanding or retracting the comment content and the like. In a specific implementation, the first interaction instruction is a related information display instruction. Correspondingly, the step of performing an operation corresponding to the first interaction instruction comprises: displaying information related to the information card in a new window of the display screen. Wherein, the related information display instruction can be issued by clicking on a button or by a gesture operation, which is not limited in the embodiments of the present application. In addition, the information related to an information card can be detailed content corresponding to the content in the information card, and can also be comment content corresponding to the content in the information card. One example: the information card includes abstracts of pictures and texts, and a "read more" prompt button can be provided in the information card, the device for displaying information receives a related information display instruction after a user clicks on this prompt button, then a new window can be displayed in which more detailed content related to the information for informative purpose in the information card is displayed. Another example: the information card includes abstracts of pictures and texts, and prompt buttons such as "enter to the application" can be provided in the information card, the device for displaying information receives a related information display instruction after a user clicks on this prompt button, then the application program corresponding to the content included in the information card is invoked, i.e., a new window is displayed so as to enable users to browse more content.

Moreover, when the first interaction instruction is a related information display instruction, the method provided by the embodiments of the present application can also comprise: receiving a second interaction instruction issued based on the new window of the display screen, performing an operation corresponding to the second interaction instruction.

Wherein, the second interaction instruction can be a collection instruction, a forwarding instruction, a link viewing instruction, an existing-comment viewing instruction and the like, and for a different second interaction instruction, different interaction operations are performed on the information in the new window.

In a specific implementation, the first interaction instruction is a layout adjusting instruction; the step of performing an operation corresponding to the first interaction instruction comprises:

obtaining at least two summary cards to be displayed, wherein the content of each of the summary cards is determined according to the information for informative purpose obtained from the network side, the at least two summary cards include an summary card of the information card currently being displayed;

replacing the information card currently being displayed with the at least two summary cards.

Specifically, when determining the content of one summary card according to information for informative purpose obtained from the network side, in one case, the information for informative purpose can be one piece of complete information for informative purpose obtained from the network side, in this case, when this information for informative purpose is displayed in an summary card, it can be displayed in a reduced size. In another case, it can be partial information of one piece of complete information for informative purpose obtained from the network side, such as image information, title of texts, and brief introduction of content. In this case, when this partial information is displayed in an summary card, it can be displayed according to a preset interface layout manner; for example, the image is displayed on the left side of an summary card, and the text is displayed on the right side of an summary card.

It should be emphasized that the at least two summary cards can be arranged in a spaced manner. Then these summary cards can be uniformly arranged in an equally spaced manner, and can also non-uniformly arranged in a non-equally spaced manner, which is not limited in the present application.

A person skilled in the art can appreciate that, plural pieces of information for informative purpose obtained from the network side may belong to different types according to different classification perspectives. For example, it can be divided into information for informative purpose of news, practical and advertisement types and the like from the perspective of content type, and can be divided into headlines and non-headlines and the like from the perspective network hot topic of content. Based on this, when the at least two summary cards are uniformly arranged in an equally spaced manner, when viewing horizontally, the summary cards can form a row of summary cards; and when viewing vertically, the summary cards can form a column of summary cards. Based on this, one row or one column of summary cards can correspond to one type of information for informative purpose, such that users can conveniently find the summary card corresponding to the information for informative purpose needed according to the classification.

Specifically, it is possible to preset the maximum number of summary cards included in each row and/or each column of summary cards displayed on the display screen, for example, 3, 4, and so on. Assuming that one row of summary cards correspond to one type of information for informative purpose and the preset maximum number of summary cards included in one row of summary cards displayed on a display screen is 4, the number of summary cards corresponding to various types of information for informative purpose as well as the number of summary cards in a row of summary cards displayed on the display screen are respectively as follows: the number of summary cards corresponding to the news type is 4, the number of summary cards displayed in this row is 4; the number of summary cards corresponding to the practical type is 3; the number of summary cards displayed in this row is 3; the number of summary cards corresponding to the advertisement is 2; the number of summary cards displayed in this row is 2. From the above, the number of summary cards displayed in each row will be smaller than or equal to the maximum number of summary cards included in a preset row.

And, when one row or column of the summary cards corresponds to one type of information for informative purpose, it is also possible to display a classification identifier on a preset location, for example, to display a classification identifier on the upper left corner of a row of summary cards and to display a classification identifier on the top of a column of summary cards and the like.

Specifically, refer to FIGS. 8A-8D, which are line drawings of an interface illustrating the process of replacing the information cards currently being displayed with at least two summary cards. Seen from these four line drawings, after the reception of a layout adjusting instruction, the information card currently being displayed gradually becomes smaller and is finally replaced with the corresponding summary card, other summary card gradually entering the display screen, and finally the summary card of the information card currently being displayed and other summary cards are displayed on the display screen together. It should be noted, the process shown in FIGS. 8A-8D is only one case of replacing the information card currently being displayed with at least two summary cards, and the specific implementation of this replacing process is not limited in the present application.

Moreover, the above at least two summary cards can be displayed in at least one column as an summary card queue, wherein the summary cards in the summary card queue are arranged in a non-overlapping manner; the at least two summary cards can be displayed in at least one row as an abstract picture queue. Specifically, the summary card queue includes at least one summary card. Various summary cards in one summary card queue can be arranged in an equally spaced and non-overlapping manner, and can also be arranged in a non-equally spaced and non-overlapping manner, which is not limited in the present application. Refer to FIGS. 9A-9E, which are line drawings of an interface illustrating the process of replacing the information card currently being displayed with at least two summary cards. Seen from these five line drawings, after the reception of a layout adjusting instruction, the information cards currently being displayed are gradually transformed into summary cards from a horizontal arrangement, and transformed into summary cards arranged vertically in a overlapping manner, and during the overlapping and transforming processes, the summary cards gradually become smaller, and the summary cards of information cards that are not currently displayed gradually enter the display screen. From the comparison of FIG. 9A and FIG. 9E, content in an summary card is only a part of content in an information card, the arrangement of images, texts in the summary card varies with respect to the arrangement of images, texts in the information card and is transformed from a vertical direction into a horizontal direction. It should be noted, the process shown in FIGS. 9A-9E is only one case of replacing the information card currently being displayed with at least two summary cards, and the specific implementation of this replacing process is not limited in the present application.

The process of adjusting the display of an information card into the display of an summary card after the reception of a layout adjusting instruction (hereinafter referred to as a first layout adjusting instruction) has been described above. Specifically, it is also possible to adjust the display of an summary card into the display of an information card after the reception of another layout adjusting instruction (hereinafter referred to as a second layout adjusting instruction). Optionally, during the adjustment of the display of an summary card into the display of an information card, the information card can be an information card displayed before the adjustment into the display of an summary card, the information card can also be an information card corresponding to a new summary card that a user selected, which is not limited in the present application.

Besides, during the layout adjustment, the above first layout adjusting instruction can be an instruction generated after the detection of a finger pinch-in gesture, and the above second layout adjusting instruction can be an instruction generated after the detection of a finger pinch-out gesture, in this case, after adjusting the display of an summary card into the display of an information card, the displayed information card includes an information card displayed before the adjustment into the display of an summary card. Moreover, the above second layout adjusting instruction can also be an instruction generated by a user clicking an summary card, in this case, after adjusting the display of an summary card into the display of an information card, the displayed information card includes an information card corresponding to the summary card on which the user clicks.

It should be noted that, the specific instruction content of the above first interaction instruction is just given For example, and should not limit the embodiments of the invention. The first interaction instruction can also be a collection instruction, a commenting instruction, a forwarding instruction, a link viewing instruction, an existing-comment viewing instruction and the like. For example, when the first interaction instruction is a commenting instruction, a user can issue a comment instruction by clicking on a comment button on an information card, and the device for displaying information can display a comment area and the existing comment information corresponding to the information for informative purpose in the information card currently being displayed after receiving the commenting instruction, the user can input comment information and performs a submission operation, the device for displaying information can obtain the input comment information and upload the same to a corresponding third-party server or a server thereof, so as to store these information. When the first interaction instruction is a commenting instruction, a user can input comment content in the comment in the information card currently being displayed and perform a submission operation, and thus issue a comment instruction, then after obtaining the commenting instruction, the device for displaying information extracts the comment information input by the user and uploads the extracted comment information to a third-party server or a server thereof so as to store these information. Of course, when the first interaction instruction is a commenting instruction, a user can issue a commenting instruction by clicking on a button or by a gesture operation, then the device for displaying information can firstly overturn a card, a comment area and the existing comment information corresponding to the information for informative purpose in the information card currently being displayed being present on the flipped over card, the user can input comment information in the comment area and performs a submission operation, thus the terminal can obtain the inputted comment information and upload the same to a third-party server or a server thereof, so as to store these information.

Another example: when the first interaction instruction is a collection instruction, a user can issue a collection instruction by clicking on a button or issuing a gesture operation, i.e., the long-press gesture, and the device for displaying information can obtain this collection instruction and perform collection processing on the information for informative purpose in the information card currently being displayed, such that the user can view the information for informative purpose in the information card currently being displayed by entering the collection page at another time.

Another example: when the first interaction instruction is a detail instruction, a user can issue a detail instruction by clicking on a button or issuing a gesture operation, and the device for displaying information can obtain the detail instruction, and thus display, on the information card currently being displayed, the detailed content corresponding to the included information for informative purpose. It can be understood that, if the information for informative purpose in the information card currently being displayed is complete, i.e., is detailed content per se, then in response to the detail instruction, the content in the information card currently being displayed does not vary. If the information for informative purpose in the information card currently being displayed is abstract content or other incomplete content, then in response to the detail instruction, the content in the information card currently being displayed varies.

Another example: when the first interaction instruction is forwarding instruction, a user can issue a forwarding instruction by clicking on a button or issuing a gesture operation, and the device for displaying information can obtain this forwarding instruction, and thus invoke various forwarding interfaces, such as friends circle on WeChat, friends on WeChat, and mobile QQ and the like, such that users can select the desired forwarding mode so as to forward the complete content of the information for informative purpose in the information card currently being displayed itself or corresponding thereto. It can be understood that invoking various forwarding interfaces and the forwarding operations can be implemented by any technology in the prior art, which is not limited in the present application.

Another example: when the first interaction instruction is a link viewing instruction, a user can click on the network link address included by information for informative purpose in the information card currently being displayed and thus issue a link viewing instruction, and the device for displaying information can obtain the link viewing instruction and invoke a default browser to load the network link. In addition, it can be understood that in a lock-screen state in which a password is set, if the default browser does not belong to a preset unlock invocation list, the default browser can be invoked without requiring a user to input passwords, and if the default browser belongs to a preset unlock invocation list, it is required for a user to input passwords to invoke the default browser, wherein, the preset unlock invocation list is used for recording the application which can be invoked after the screen is unlocked, and the preset unlock invocation list can be set manually or set automatically by a system, which are both reasonable.

It can be understood that, for a collection instruction, it means that a user is interested in certain information if the user issues a collection instruction for this information, and thus, the information collected by a user can reflect the type of information he/she prefers. Thus, during the display of information for informative purpose to a user through an information card, it is possible to screen the network information for informative purpose obtained from the network side according to the user's preferences so as to obtain and display the information for informative purpose in which the user is interested, so as to achieve the purpose of personalized recommendation. It can be understood that, the analysis of users' interest according to the historical information can be realized by any method in the prior art, which will not be repeatedly described here.

In the embodiments of the present application, the usage of fragmented spare time of users is improved and meanwhile the interaction between users and terminals can be further enhanced. It should be emphasized that, the embodiment corresponding to any one of the above figures can also include S105-106, thereby forming a new embodiment of a method, which will not be repeatedly described here.

Figure 10:
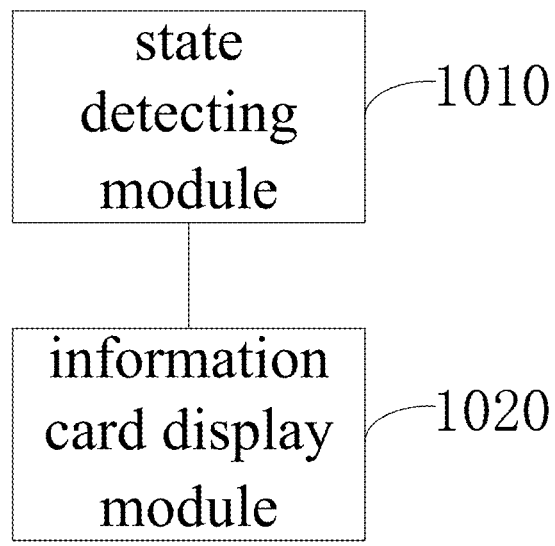
FIG. 10 is a schematic structural diagram of a device for displaying information provided by embodiments of the present application.

Corresponding to the above embodiments of the method, embodiments of the present application further provide a device for displaying information, as shown in FIG. 10, which comprises:

a state detecting module 1010, for detecting whether a display screen of a terminal equipment switches from a screen-off state to a screen-on state when the display screen is in the screen-off state;

an information card display module 1020, for displaying at least one information card on the display screen after it is detected that the display screen switches from the screen-off state to the screen-on state, wherein, the at least one information card includes information for informative purpose obtained from a network side, and the size of the at least one information card is smaller than that of the display screen.

The solution provided by the embodiments of the present application comprises: detecting whether a display screen of a terminal equipment switches from a screen-off state to a screen-on state when the display screen is in the screen-off state; displaying at least one information card on the display screen after it is detected that the display screen switches from the screen-off state to the screen-on state, wherein, the information card includes information for informative purpose obtained from a network side, and the size of the information card is smaller than that of the display screen. In the present solution, information for informative purpose is pushed to a user in the form of information cards when a display screen of a terminal device switches from a screen-off to a screen-on, such that the user can browse the information for informative purpose during the fragmented spare time when the screen switches between the screen-on and the screen-off, thereby improving the usage of fragmented spare time of users.

Optionally, in a specific implementation, the information for informative purpose obtained from a network side comprises:

received information for informative purpose sent by a network-side server; or information for informative purpose obtained from a network-side server according to user instruction.

Optionally, in a specific implementation, the information card display module 1020 is specifically used for:

determining whether the display screen is maintained in the screen-on state for a preset screen-on period, after it is detected that the display screen switches from the screen-off state to the screen-on state, if so, displaying at least one information card on the display screen.

Optionally, in a specific implementation, the state detecting module 1010 is specifically used for detecting whether a display screen of a terminal equipment switches from a screen-off state to a screen-on state when the display screen is in the screen-off state and in a lock-screen state.

Optionally, in a specific implementation, the information card display module 1020 is specifically used for displaying the at least one information card on the display screen horizontally.

Optionally, the information card comprises a multimedia resource displaying area and/or text area, wherein the multimedia resource displaying area is used for displaying multimedia resource information, and the text area is used for displaying text information.

Optionally, in a specific implementation, the device provided by the embodiments of the present application can also comprise:

a prompt information display module for displaying prompt information on a preset position of the display screen, the prompt information is used for prompting the presence of other information cards.

Optionally, in a specific implementation, the prompt information display module can comprise:

a prompt card display submodule for displaying a prompt card on a preset position of the display screen.

Optionally, in a specific implementation, the prompt card display submodule is specifically used for:

displaying the prompt card on the left boundary and/or the right boundary of the display screen, wherein, the size of the prompt card is set according to the remaining size of the display screen which is the size obtained by subtracting, from the size of the display screen, the size of the information card currently being displayed.

Optionally, in a specific implementation, the device provided by the embodiments of the present application can also comprise:

a switching-instruction receiving module for receiving a switching instruction;

a card updating module for replacing the at least one information card currently being displayed with at least one new information card on the display screen.

Optionally, in a specific implementation, the switching-instruction receiving module is specifically used for:

receiving a switching instruction input by a user; or receiving a switching instruction generated according to a preset rule.

Optionally, in a specific implementation, the switching-instruction receiving module is specifically used for receiving a rightward switching instruction or a leftward switching instruction;

the card updating module is specifically used for:

when receiving the rightward switching instruction, moving the at least one information card currently being displayed rightward out of the display screen while moving the at least one new information card into the display screen from left to right; and when receiving the leftward switching instruction, moving the at least one information card currently being displayed leftward out of the display screen while moving at least one new information card into the display screen from right to left.

Optionally, in a specific implementation, the rightward switching instruction is issued by a rightward sliding gesture; the leftward switching instruction is issued by a leftward sliding gesture.

Optionally, in a specific implementation, the device provided by the embodiments of the present application can further comprise a first-interaction-instruction receiving module for receiving a first interaction instruction for the information card;

a first-interaction-operation performing module for performing an operation corresponding to the first interaction instruction.

Optionally, in a specific implementation, the first interaction instruction is an instruction of moving out card, correspondingly, the first-interaction-operation performing module is specifically used for moving the information card upward or downward out of the display screen;

or, the first interaction instruction is an instruction of flipping over card, correspondingly, the first-interaction-operation performing module is specifically used for flipping over the information card;

or, the first interaction instruction is a card size adjusting instruction, correspondingly, the first-interaction-operation performing module is specifically used for adjusting the size of the information card on the display screen;

the first interaction instruction is an instruction of adjusting the number of cards, correspondingly, the first-interaction-operation performing module is specifically used for adjusting the number of the information cards displayed on the display screen;

the first interaction instruction is an information state adjusting instruction, correspondingly, the first-interaction-operation performing module is specifically used for adjusting the display state of information in the information card.

Optionally, in a specific implementation, the first interaction instruction is a related information display instruction, correspondingly, the first-interaction-operation performing module is used for displaying information related to the information card in a new window of the display screen.

Optionally, in a specific implementation, the device provided by the embodiments of the present application can also comprise:

a second-interaction-instruction receiving module for receiving a second interaction instruction issued based in the new window of the display screen;

a second-interaction-operation performing module, for performing an operation corresponding to the second interaction instruction.

Optionally, the first interaction instruction is a layout adjusting instruction;

the first-interaction-operation performing module is specifically used for obtaining at least two summary cards to be displayed, wherein the content of each of the summary cards is determined according to the information for informative purpose obtained from the network side, and the at least two summary cards include an summary card of the information card currently being displayed;

replacing the information card currently being displayed with the at least two summary cards.

Optionally, the at least two summary cards are arranged in a spaced manner.

Optionally, the at least two summary cards are uniformly arranged in an equally spaced manner;

one row or one column of summary cards correspond to one type of information for informative purpose.

Optionally, the at least two summary cards are displayed in at least one column as an summary card queue, wherein the summary cards in the summary card queue are arranged in a non-overlapping manner; or the at least two summary cards are displayed in at least one row as a summary card queue.

Figure 11:
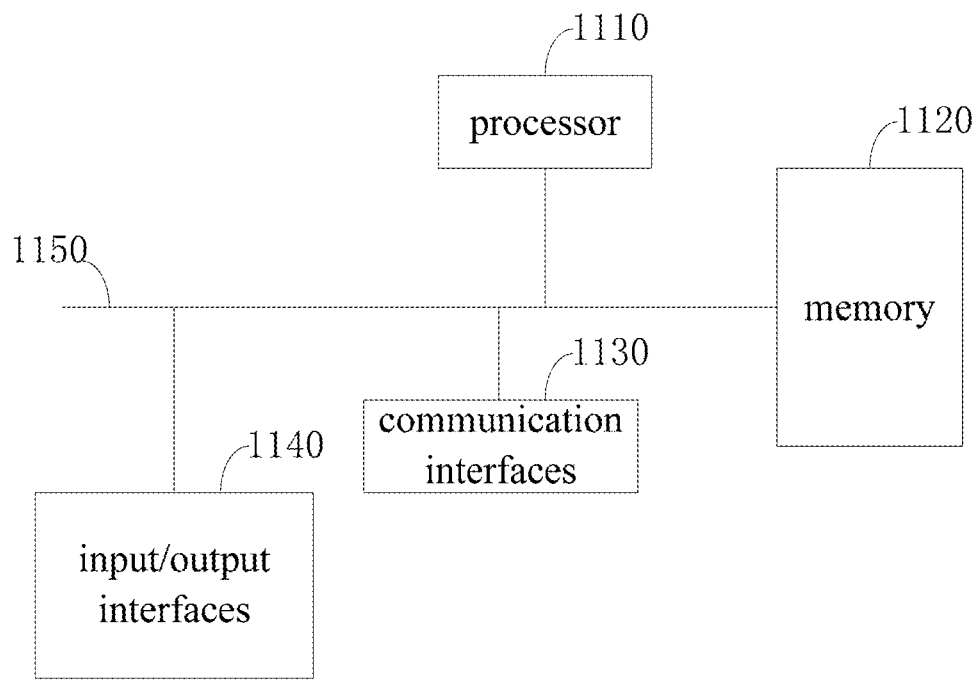
FIG. 11 is a schematic structural diagram of a terminal equipment provided by embodiments of the present application.

Corresponding to the above embodiments of the method, the embodiments of the present application further provide a terminal equipment. As shown in FIG. 11, the terminal equipment comprises: a processor 1110, a memory 1120, communication interfaces 1130, input/output interfaces 1140 and a bus 1150, wherein the processor 1110, the memory 1120, the communication interfaces 1130 and the input/output interfaces 1140 are connected to the bus 1150 respectively, the memory 1120 being used for storing executable program codes; the possessor 1110 executing a program corresponding to the executable program codes by reading the executable program codes stored in the memory 1120, so as to perform the methods for displaying information provided by the embodiments of the present application. Wherein, the method for displaying information provided by the embodiments of the present application comprises the following steps:

detecting whether a display screen of a terminal equipment switches from a screen-off state to a screen-on state when the display screen is in the screen-off state;

displaying at least one information card on the display screen after it is detected that the display screen switches from the screen-off state to the screen-on state, wherein, the at least one information card includes information for informative purpose obtained from a network side, and the size of the at least one information card is smaller than that of the display screen.

Regarding the specific process of performing the above steps by the processor 1110 and the steps performed by the processor 1110 through operating executable program codes, reference can be made to the related description of the method provided by the embodiments of the application, which will not be repeatedly described here.

Wherein a display screen of a terminal equipment acts as the input/output interface when the display screen is a touch screen; and a display screen of a terminal equipment acts as the output interface with a keyboard and/or a mouse as the input interface when the display screen is a non-touch screen.

The terminal equipment is present in a variety of forms, which comprises but is not be limited to:

(1) a mobile communication equipment: this kind of equipment is characterized in the ability of mobile communication and mainly aims to provide voice and data communication. This kind of terminal comprises: smartphones (e.g. iPhone), multimedia phones, functional phones and low-end phones and the like.

(2) an ultra-mobile personal computer equipment: this kind of equipment belongs to the category of personal computer, which has the function of computing and possessing and generally possesses mobile networking property. This kind of terminal comprises: PDA, MID and UMPC equipment and the like, for example iPad.

(3) a portable entertainment equipment: this kind of equipment can display and play multimedia content. This kind of equipment comprises: audio and video players (for example, iPods), handheld game consoles, e-book reader and intelligent toys and portable vehicle navigation equipment.

(4) other electronic devices with data interaction function.

In the present embodiment, the processor of this terminal equipment executes a program corresponding to the executable program codes by reading the executable program codes stored in the memory, this program performs the methods for displaying information provided by the embodiments of the present application when in operation, so as to achieve the following effects: information for informative purpose is pushed to a user in the form of information cards when a display screen of a terminal device switches from a screen-off to a screen-on, such that the user can browse the information for informative purpose during the fragmented spare time when the screen switches between the screen-on and the screen-off, thereby improving the usage of fragmented spare time of users.

Corresponding to the above embodiments of the method, the embodiments of the present application further provide an application program, which is used for performing the methods for displaying information provided by the present application when in operation. Wherein, the method for displaying information provided by the embodiments of the present application comprise the following steps: detecting whether a display screen of a terminal equipment switches from a screen-off state to a screen-on state when the display screen is in the screen-off state; displaying at least one information card on the display screen after it is detected that the display screen switches from the screen-off state to the screen-on state, wherein, the at least one information card includes information for informative purpose obtained from a network side, and the size of the at least one information card is smaller than that of the display screen.

In the present embodiment, an application program performs the methods for displaying information provided by the embodiments of the present application when in operation, so as to achieve the following effects: information for informative purpose is pushed to a user in the form of information cards when a display screen of a terminal device switches from a screen-off to a screen-on, such that the user can browse the information for informative purpose during the fragmented spare time when the screen switches between the screen-on and the screen-off, thereby improving the usage of fragmented spare time of users.

Corresponding to the above embodiments of the method, embodiments of the present application further provide a storage medium, which is configured to store the executable program codes that are operated to perform the method for displaying information provided by the present application. Wherein, the method for displaying information provided by the embodiments of the present application comprises the following steps: detecting whether a display screen of a terminal equipment switches from a screen-off state to a screen-on state when the display screen is in the screen-off state; displaying at least one information card on the display screen after it is detected that the display screen switches from the screen-off state to the screen-on state, wherein, the at least one information card includes information for informative purpose obtained from a network side, and the size of the at least one information card is smaller than that of the display screen.

In the present embodiment, a storage medium stores executable codes that execute the methods for displaying information provided by the embodiments of the present application when in operation, so as to achieve the following effects: information for informative purpose is pushed to a user in the form of information cards when a display screen of a terminal device switches from a screen-off to a screen-on, such that the user can browse the information for informative purpose during the fragmented spare time when the screen switches between the screen-on and the screen-off, thereby improving the usage of fragmented spare time of users.

It should be noted that, embodiments of a terminal equipment or an application program as well as a storage medium are simply described since they are essentially similar to embodiments of a method, and the related parts could refer to the parts of the description of embodiments of a method. It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

All embodiments in the description are described in a correlated manner, and identical or similar parts in various embodiments can be referred to one another, the description for each embodiment all focuses on the differences with other embodiments. Especially, the embodiments of a system are briefly described and reference can be made to the description of the embodiments of a method for its related contents since the embodiments of the device are substantially similar to those of the method. The embodiments of a system or a device are briefly described and reference can be made to the description of the embodiments of a method for its related contents since the embodiments of the device are substantially similar to those of the method.

The embodiments described above are just preferable embodiments of the present application, and not indented to limit the protection scope of the present application. Any modifications, alternatives, improvements or the like within the spirit and principle of the present application shall be comprised in the protection scope of the present application.

What is claimed is:

1. A method for displaying information, wherein the method comprises:
    detecting whether a display screen of a terminal equipment switches from a screen-off state to a screen-on state when the display screen is in the screen-off state, during a detection time period, wherein the detection time period is set according to usage of a terminal equipment by a user such that the detecting is only performed during a time period in which the user frequently operates the terminal equipment; and
    displaying at least one information card on the display screen after it is detected that the display screen switches from the screen-off state to the screen-on state, wherein, the at least one information card includes information for informative purpose obtained from network side, and the size of the at least one information card is smaller than that of the display screen, the number of the at least one information card is determined according to the size of the display screen, background content or title of the at least one information card corresponds to the source of information for informative purpose such that the user is able to clearly know the source of information for informative purpose in the information card currently being displayed,
    wherein, before displaying at least one information card on the display screen, the method further comprises: determining whether the display screen is maintained in the screen-on state for a preset screen-on period, and if so, performing the step of displaying at least one information card on the display screen, and
    wherein, displaying at least one information card on the display screen comprises displaying multiple information cards in at least one row or column on the display screen;
    wherein, the method further comprises: receiving a first interaction instruction for the information card; and when the first interaction instruction is a commenting instruction, flipping over the information card, showing a comment area and existing comment information corresponding to previously displayed information for informative purpose in the information card on the reverse side of the information card, and wherein comment information is inputted in the comment area and submitted by the user such that the terminal obtains the inputted comment information and upload the same to a third-party or a server thereof, so as to store the comment information;
    wherein the method further comprises: selecting plural pieces of information for informative purpose obtained from the network side according to preset screening rules and displaying the selected plural pieces of information for informative purpose on the at least one information card, wherein the preset screening rules is determined according to how much the user is interested in various obtained information resources from previous statistical work;
    and dividing the plural pieces of information for informative purpose obtained from the network side into different types according to content type and network hot topic of content such that the plural pieces of information for informative purpose are displayed according to corresponding type thereof.

2. The method according to claim 1, wherein, the information for informative purpose obtained from network side includes one of the followings:
    received information for informative purpose sent by a network-side server; and
    information for informative purpose obtained from the network-side server according to a user instruction.

3. The method according to claim 1, wherein, the step of displaying at least one information card on the display screen comprises:
    displaying the at least one information card on the display screen horizontally.

4. The method according to claim 1, wherein the method further comprises:
    displaying prompt information in a preset position of the display screen, the prompt information being used for prompting the presence of other information cards.

5. The method according to claim 4, wherein, the step of displaying prompt information in a preset position of the display screen comprises:
    displaying a prompt card in the preset position of the display screen.

6. The method according to claim 5, wherein, the step of displaying a prompt card in the preset position of the display screen comprises:
    displaying the prompt card on the left boundary and/or the right boundary of the display screen, wherein, the size of the prompt card is set according to the remaining size of the display screen, which is the size obtained by subtracting, from the size of the display screen, the size of the information card currently being displayed.

7. The method according to claim 1, wherein the method further comprises:
    receiving a switching instruction; and
    replacing the at least one information card currently being displayed with at least one new information card on the display screen.

8. The method according to claim 7, wherein, the step of receiving a switching instruction comprises:
    receiving a rightward switching instruction or a leftward switching instruction; and
    the step of replacing the at least one information card currently being displayed with at least one new information card on the display screen comprises:
        when receiving the rightward switching instruction, moving the at least one information card currently being displayed rightward out of the display screen while moving the at least one new information card into the display screen from left to right; and
        when receiving the leftward switching instruction, moving the at least one information card currently being displayed leftward out of the display screen while moving at least one new information card into the display screen from right to left.

9. The method according to claim 1, wherein, the step of performing an operation corresponding to the first interaction instruction comprises one of the followings:
    moving the information card upward or downward out of the display screen when the first interaction instruction is an instruction of moving out card;
    flipping over the information card when the first interaction instruction is an instruction of flipping over card;
    adjusting the size of the information card on the display screen when the first interaction instruction is a card size adjusting instruction;

adjusting the number of the information cards displayed on the display screen when the first interaction instruction is an instruction of adjusting the number of cards; and adjusting the display state of information in the information card when the first interaction.

10. The method according to claim 1, wherein the first interaction instruction is a related information display instruction, correspondingly, the step of performing an operation corresponding to the first interaction instruction comprises: displaying information related to the information card in a new window of the display screen.

11. The method according to claim 1 wherein,
the first interaction instruction is a layout adjusting instruction, and
the step of performing an operation corresponding to the first interaction instruction comprises:
obtaining at least two summary cards to be displayed, wherein the content of each of the summary cards is determined according to the information for informative purpose obtained from the network side, and the at least two summary cards include an summary card of the information card currently being displayed; and
replacing the information card currently being displayed with the at least two summary cards.

12. The method according to claim 11, wherein, the at least two summary cards are arranged in a spaced manner.

13. The method according to claim 11, wherein, the at least two summary cards are displayed in one of the following ways:
the at least two summary cards are displayed in at least one column as an summary card queue, wherein the summary cards in the summary card queue are arranged in a non-overlapping manner; and
the at least two summary cards are displayed in at least one row as a summary card queue.

14. A non-temporary non-transitory storage medium, wherein the non-temporary non-transitory storage medium is used for storing executable program codes which is operated to perform the method for displaying information according to claim 1.

15. A terminal equipment, wherein terminal equipment comprises: a processor, a memory, communication interfaces, input/output interfaces and a bus, wherein the processor, the memory, the communication interfaces and the input/output interfaces are connected to the bus respectively, the memory is used for storing executable program codes; the processor executes a program corresponding to the executable program codes by reading the executable program codes stored in the memory so as to perform a method for displaying information, wherein the method for displaying information comprises:
detecting whether a display screen of a terminal equipment switches from a screen-off state to a screen-on state when the display screen is in the screen-off state, during a detection time period, wherein the detection time period is set according to usage of a terminal equipment by a user such that the detecting is only performed during a time period in which the user frequently operates the terminal equipment; and
displaying at least one information card on the display screen after it is detected that the display screen switches from the screen-off state to the screen-on state, wherein, the at least one information card includes information for informative purpose obtained from network side, and the size of the at least one information card is smaller than that of the display screen, the number of the at least one information card is determined according to the size of the display screen, background content or title of the at least one information card corresponds to the source of information for informative purpose such that the user is able to clearly know the source of information for informative purpose in the information card currently being displayed, wherein, before displaying at least one information card on the display screen, the method further comprises: determining whether the display screen is maintained in the screen-on state for a preset screen-on period, and if so, performing the step of displaying at least one information card on the display screen, and wherein, displaying at least one information card on the display screen comprising displaying multiple information cards in at least one row or column on the display screen;

wherein, the method further comprises: receiving a first interaction instruction for the information card; and when the first interaction instruction is a commenting instruction, flipping over the information card, showing a comment area and existing comment information corresponding to previously displayed information for informative purpose in the information card on the reverse side of the information card, and wherein comment information is inputted in the comment area and submitted by the user such that the terminal obtains the inputted comment information and upload the same to a third-party or a server thereof, so as to store the comment information;

wherein the method further comprises: selecting plural pieces of information for informative purpose obtained from the network side according to preset screening rules and displaying the selected plural pieces of information for informative purpose on the at least one information card, wherein the preset screening rules is determined according to how much the user is interested in various obtained information resources from previous statistical work; and dividing the plural pieces of information for informative purpose obtained from the network side into different types according to content type and network hot topic of content such that the plural pieces of information for informative purpose are displayed according to corresponding type thereof.

16. The terminal equipment according to claim 15, wherein, the information for informative purpose obtained from network side includes one of the followings:
received information for informative purpose sent by a network-side server; and
information for informative purpose obtained from the network-side server according to a user instruction.

17. The terminal equipment according to claim 15, wherein, the step of displaying at least one information card on the display screen comprises:
displaying the at least one information card on the display screen horizontally.

18. The terminal equipment according to claim 15, wherein, the method for displaying information further comprises:
displaying prompt information in a preset position of the display screen, the prompt information being used for prompting the presence of other information cards.

19. The terminal equipment according to claim 18, wherein, the step of displaying prompt information in a preset position of the display screen comprises:
displaying a prompt card in the preset position of the display screen.

20. The terminal equipment according to claim 19, wherein, the step of displaying a prompt card in the preset position of the display screen comprises:
displaying the prompt card on the left boundary and/or the right boundary of the display screen, wherein, the size of the prompt card is set according to the remaining size of the display screen, which is the size obtained by subtracting, from the size of the display screen, the size of the information card currently being displayed.

21. The terminal equipment according to claim 15, wherein, the method for displaying information further comprises:
receiving a switching instruction; and
replacing the at least one information card currently being displayed with at least one new information card on the display screen.

22. The terminal equipment according to claim 21, wherein, the step of receiving a switching instruction comprises:
receiving a rightward switching instruction or a leftward switching instruction; and
the step of replacing the at least one information card currently being displayed with at least one new information card on the display screen comprises:
when receiving the rightward switching instruction, moving the at least one information card currently being displayed rightward out of the display screen while moving the at least one new information card into the display screen from left to right; and
when receiving the leftward switching instruction, moving the at least one information card currently being displayed leftward out of the display screen while moving at least one new information card into the display screen from right to left.

23. The terminal equipment according to claim 15, wherein, the step of performing an operation corresponding to the first interaction instruction comprises one of the followings:
moving the information card upward or downward out of the display screen when the first interaction instruction is an instruction of moving out card;
flipping over the information card when the first interaction instruction is an instruction of flipping over card;
adjusting the size of the information card on the display screen when the first interaction instruction is a card size adjusting instruction;
adjusting the number of the information cards displayed on the display screen when the first interaction instruction is an instruction of adjusting the number of cards; and
adjusting the display state of information in the information card when the first interaction instruction is an information state adjusting instruction.

24. The terminal equipment according to claim 15 wherein, the first interaction instruction is a related information display instruction, correspondingly, the step of performing an operation corresponding to the first interaction instruction comprises: displaying information related to the information card in a new window of the display screen.

25. The terminal equipment according to claim 15 wherein,
the first interaction instruction is a layout adjusting instruction, and
the step of performing an operation corresponding to the first interaction instruction comprises:
obtaining at least two summary cards to be displayed, wherein the content of each of the summary cards is determined according to the information for informative purpose obtained from the network side, and the at least two summary cards include an summary card of the information card currently being displayed; and
replacing the information card currently being displayed with the at least two summary cards.

26. The terminal equipment according to claim 25, wherein, the at least two summary cards are displayed in one of the following ways:
the at least two summary cards are displayed in at least one column as an summary card queue, wherein the summary cards in the summary card queue are arranged in a non-overlapping manner; and
the at least two summary cards are displayed in at least one row as a summary card queue.

* * * * *